Nov. 21, 1967     C. KRONSBEIN     3,353,726
DEVICE FOR PULLING OFF STOCKINGS
FROM FORMS AND DEPOSITING THEM

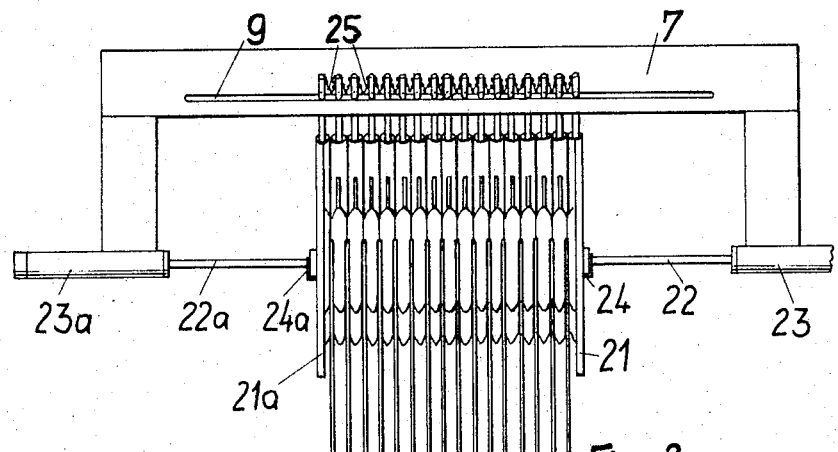
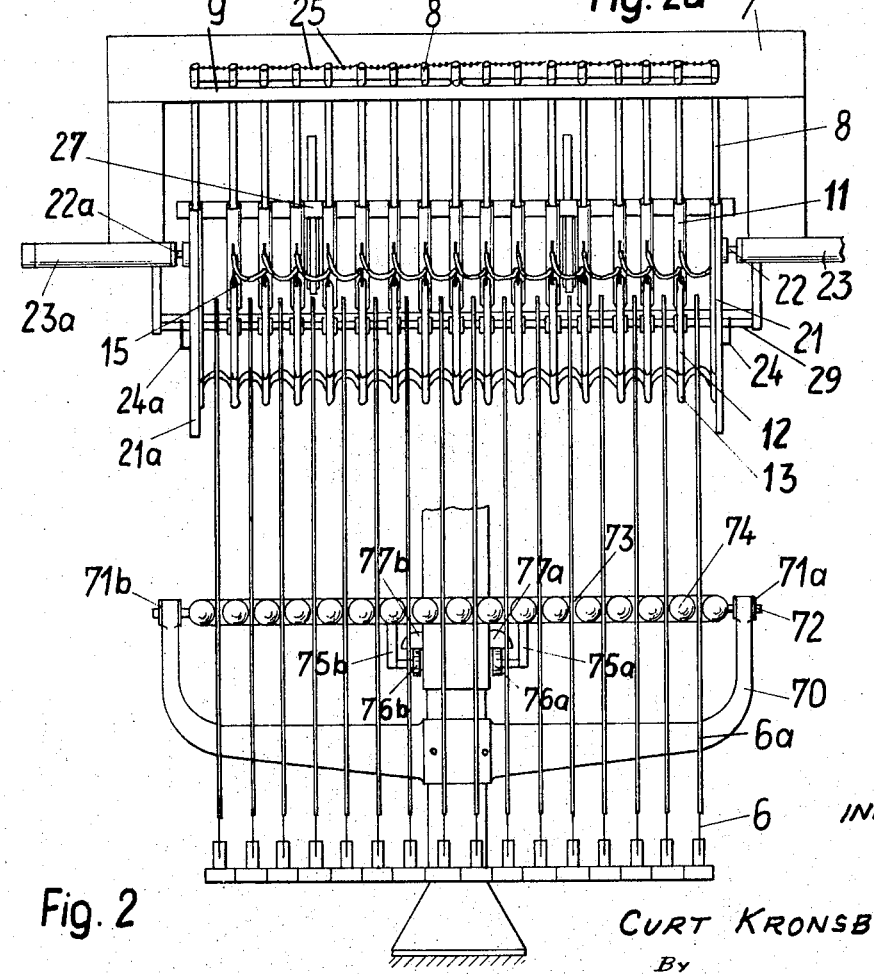
Fig. 2a
Fig. 2
INVENTOR
CURT KRONSBEIN
By Lowry & Rinehart
ATTYS.

Filed Sept. 22, 1964     21 Sheets-Sheet 3

INVENTOR
CURT KRONSBEIN
By
Lowry & Rinehart
ATTYS.

INVENTOR
CURT KRONSBEIN
By Lowry & Rinehart
ATTYS.

Nov. 21, 1967   C. KRONSBEIN   3,353,726
DEVICE FOR PULLING OFF STOCKINGS FROM FORMS AND DEPOSITING THEM
Filed Sept. 22, 1964   21 Sheets-Sheet 6

INVENTOR

CURT KRONSBEIN

By
Lowry & Rinehart
ATTYS.

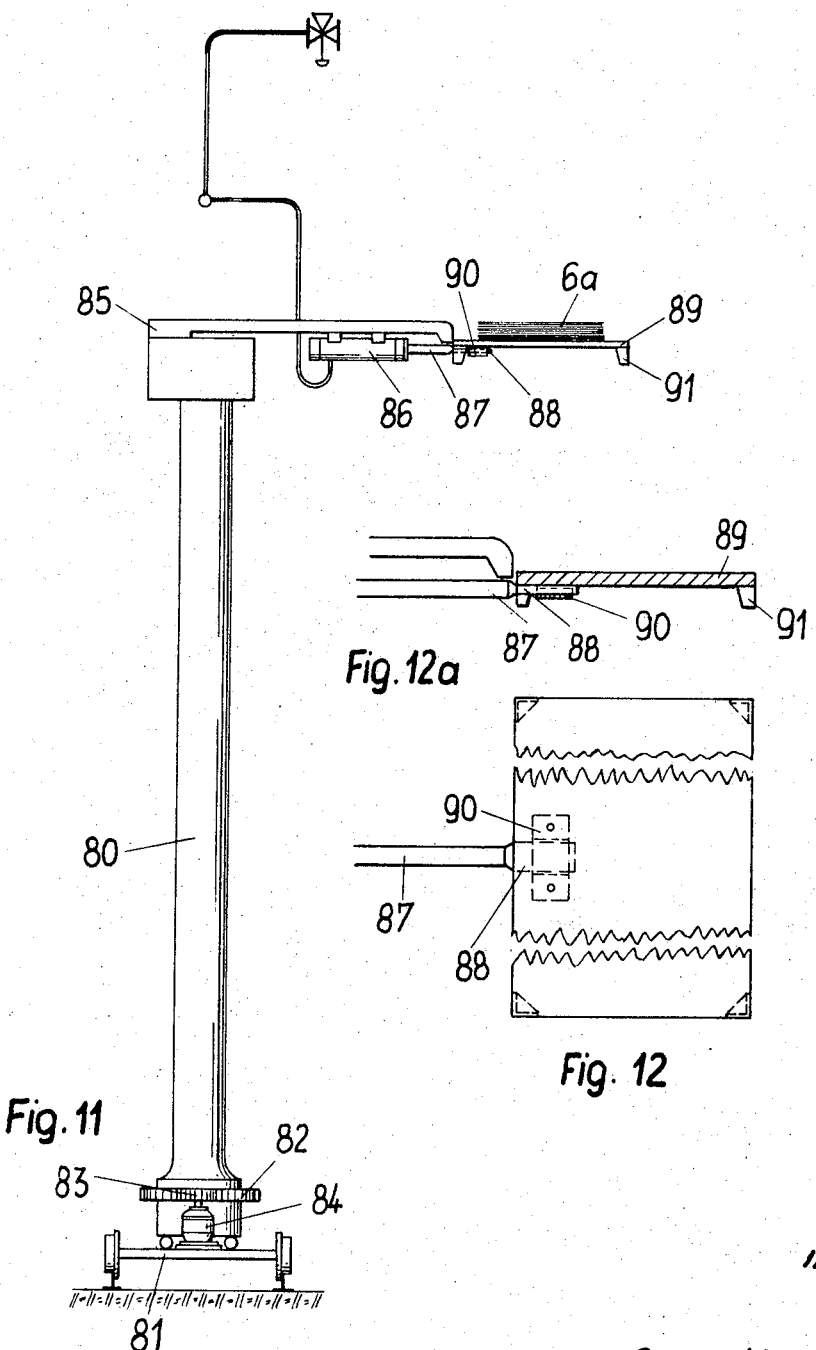

INVENTOR
CURT KRONSBEIN
By Lowry & Rinehart
ATTYS.

INVENTOR
CURT KRONSBEIN
By
Lowry & Rinehart
ATTYS.

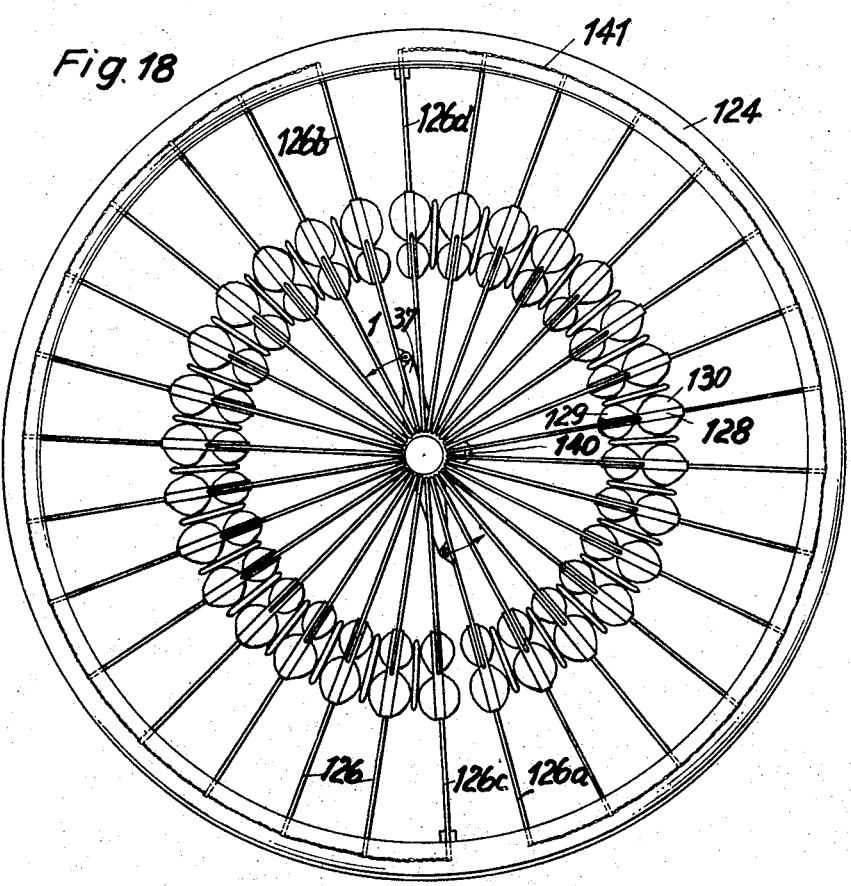

Nov. 21, 1967  C. KRONSBEIN  3,353,726
DEVICE FOR PULLING OFF STOCKINGS
FROM FORMS AND DEPOSITING THEM
Filed Sept. 22, 1964  21 Sheets-Sheet 14
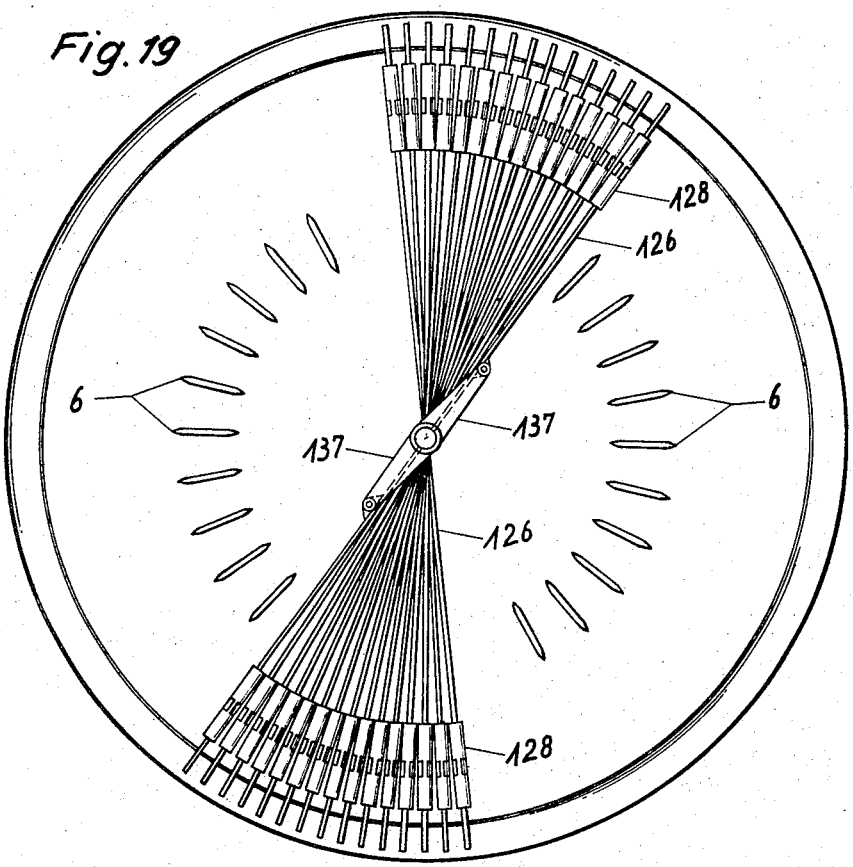
INVENTOR
CURT KRONSBEIN
By Lowry & Rinehart
ATTYS.

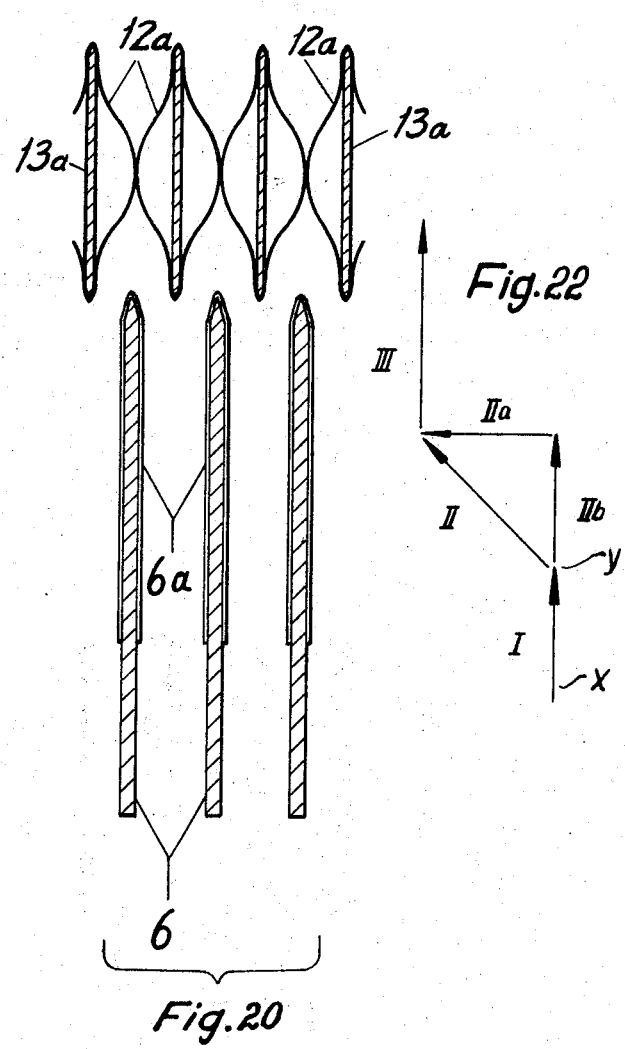

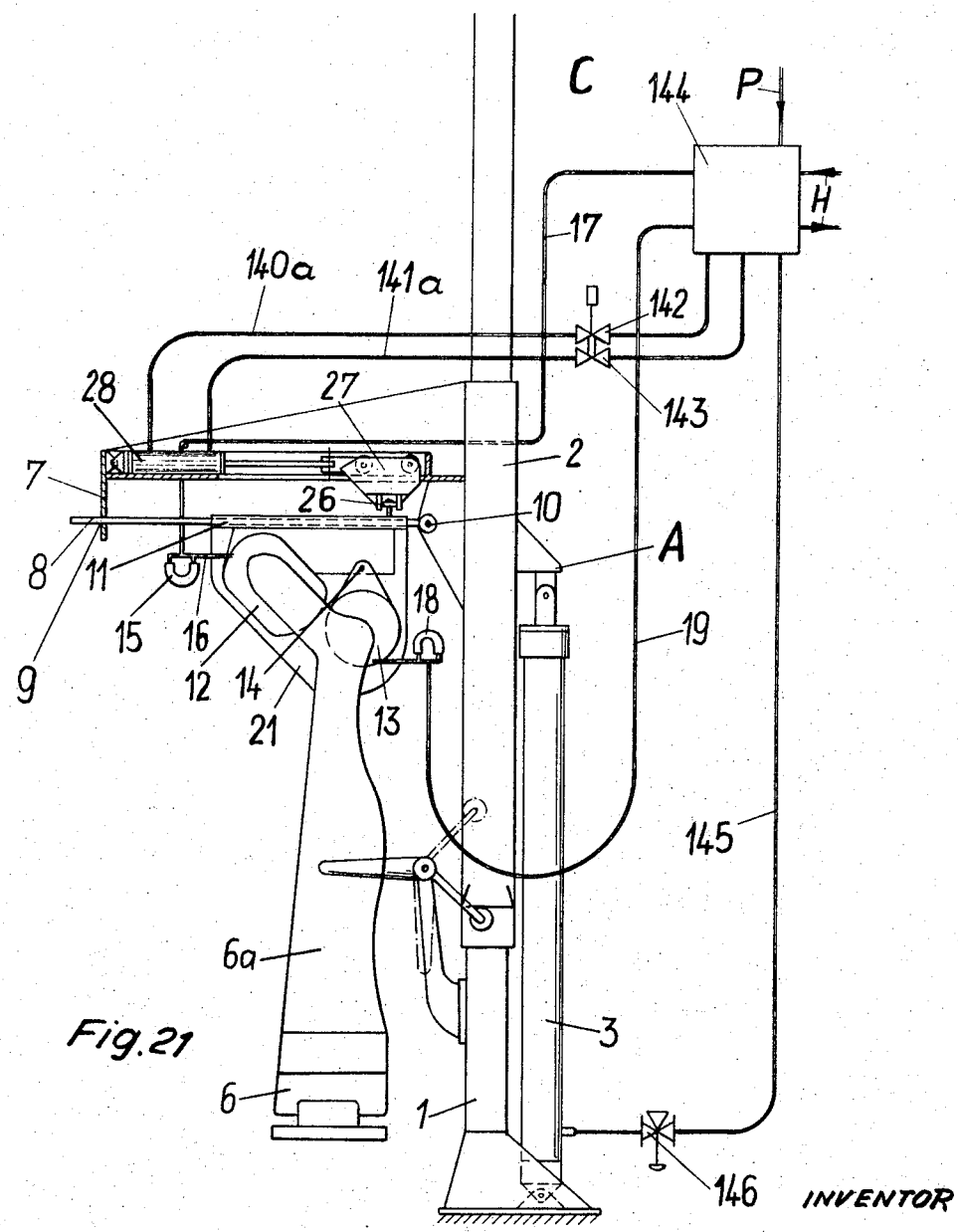

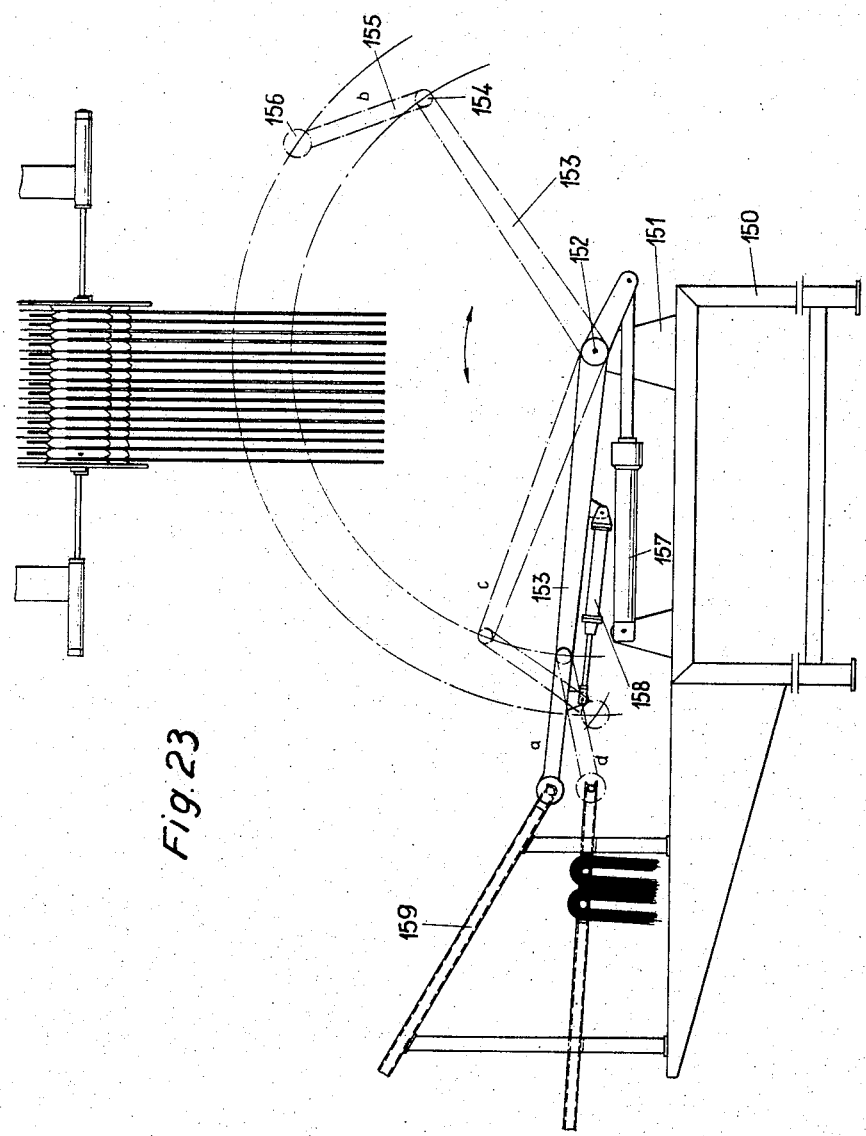

Nov. 21, 1967 C. KRONSBEIN 3,353,726
DEVICE FOR PULLING OFF STOCKINGS
FROM FORMS AND DEPOSITING THEM
Filed Sept. 22, 1964 21 Sheets-Sheet 19
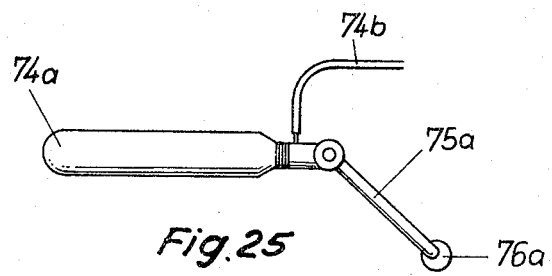
Fig. 25
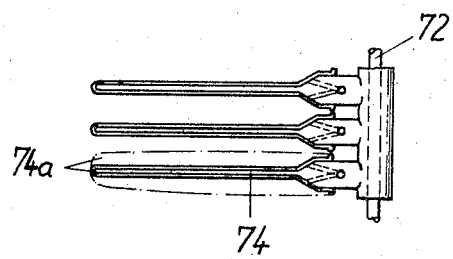
Fig. 26
Fig. 27  Fig. 28
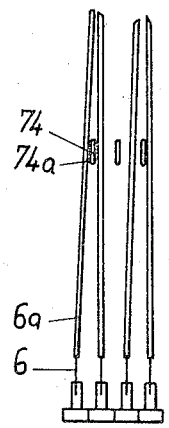 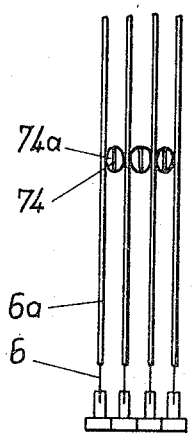
INVENTOR
CURT KRONSBEIN
BY
Lowry & Rinelair
ATTYS.

Nov. 21, 1967  C. KRONSBEIN  3,353,726
DEVICE FOR PULLING OFF STOCKINGS
FROM FORMS AND DEPOSITING THEM
Filed Sept. 22, 1964  21 Sheets-Sheet 20

INVENTOR
CURT KRONSBEIN
BY
Lowry & Rinehart
ATTYS.

United States Patent Office 3,353,726
Patented Nov. 21, 1967

3,353,726
DEVICE FOR PULLING OFF STOCKINGS FROM FORMS AND DEPOSITING THEM
Curt Kronsbein, Hagen-Boelerheide, Germany, assignor to Maschinenfabrik Eugen Bellmann G.m.b.H., Hagen-Haspe, Germany, a firm
Claims priority, application Germany, Sept. 23, 1963, M 58,300; Jan. 22, 1964, M 59,634
Filed Sept. 22, 1964, Ser. No. 398,339
25 Claims. (Cl. 223—112)

This invention relates to a device for pulling off stockings from forms and, if desired, depositing them, the forms being located in a packet approximately parallel side by side in spaced relationship.

In automatically operating stocking finishing machines the stockings are pulled upon flat forms. For transportation and treatment the forms may be combined in so-called form packets in which the forms are parallel in juxtaposed spaced relationship.

Pulling off the treated stockings from the forms and pulling untreated stockings upon the forms is a job for which personnel must be employed. Moreover, this job is fatiguing and monotonous.

The present invention provides to those skilled in the art a teaching for the construction of an automatic pulling-off device by means of which all the stockings of an arriving packet of forms can be pulled off in one operation. The pulling-off device proposed by the invention is suitable for combining the stockings like packets after they have been pulled off, if required, i.e. so that they will hang at minimum spacingse and depositing is facilitated.

The invention provides a device for pulling off stockings from forms and, if desired, depositing them, the forms being located parallel or approximately parallel in spaced relationship (i.e. in a so-called packet of forms), which device comprises a column mounted vertically on the floor or on a finishing machine, a frame movable on the column in the direction of the legs of the forms, a plurality of grippers mounted on the frame for displacement in the direction of the feet of the forms and movable in common in this direction, and a carriage or rods for moving the grippers, said frame being movable into a lowered position in which each stocking form is located with its foot portion between two cooperating grippers for pulling the stockings off the forms by moving the frame upwardly and the grippers in the direction of the feet of the forms.

In an advantageous embodiment of the present invention the grippers may be mounted on the frame for displacement transversely of the longitudinal direction of the forms and pistons or levers are provided for pulling the grippers apart and pushing them together until the stockings which have been taken off the forms hang in a packet at minimum intervals therebetween when the frame is in the lifted position.

According to a further feature of the invention the grippers expediently consist of inflatable hollow bodies and are arranged in pairs including a foot tip gripper and a heel gripper, each heel gripper being mounted for oscillating movement in the direction of the forms and each pair of grippers being mounted on a carrier shiftably mounted on the frame on a bar extending in the direction of the foot and all the bars being held in a slot and on a carrier bearing of the frame so as to be shiftable transversely of the forms.

When the bar is arranged in the direction of the feet the movement of the gripping devices is effected solely by the pushing movement of the gripping devices on the bars, the frame itself remaining in its position.

The movement of the grippers in the direction of the feet may, however, also be performed by a lifting movement of the frame, on the one hand, and a pushing movement of the carriers on the bars, on the other hand, said movements being carried out simultaneously and being adapted to each other. In this case the pulling-off movement is composed of two components of movement, namely a lifting movement of the entire frame, on the one hand, and a pushing movement of the gripping devices with their carriers on the bars, on the other hand.

Expediently hydraulic pistons are provided for both movements and operated by a common hydraulic plant, the adaptation of the two movements being effected by a corresponding throttling of the cross sections of the conduits. The adaptation must be carried out in such a manner that the movement resulting from the two movements causes a movement of the grippers exactly in the direction of the feet of the forms.

More particularly, this working method provides the possibility of adaptation to every angular position of the foot portions of the forms. Sometimes the angular positions of the foot portions are very different, depending upon the kind of the stockings.

Moreover, this provides the advantage that the bars on which the gripping devices move need not extend in the direction of the feet but may be arranged as desired. For example, they may be arranged in a horizontal plane. Thereby the construction of the frame which carries the bars becomes more simple and thus the manufacture more economical. A simplification results especially when the stocking forms are not arranged in a straight line but on a circle, for then bars arranged obliquely in the direction of the feet together form the peripheral surface of a cone, which meets with difficulties in respect of manufacture. However, when the bars are horizontally arranged they form a plane in all cases also when the forms are arranged in a circle, which in respect of construction can be realized without difficulties.

The pulling-off device proposed by the invention is so constructed that it may be part of a general arrangement for automatically carrying out both the operation of pulling off and taking off the stockings. The automatic depositing of the stockings may be achieved in that the above-mentioned arrangement is further developed as follows:

For taking off the packet of stockings still hanging in the grippers and for transporting the packet to the depositing position, a cantilever arm may be provided, which has a spring bow serving for clamping the packet of stockings. The cantilever arm may be rotatably mounted in a column and also adjustable in height. Thus, it can be adjusted to a height suitable for taking off the stockings and to the height of the depositing position. It is expedient to provide a depositing tube for the depositing operation, which is fitted on a spring sleeve on the cantilever arm, the spring sleeve being longitudinally displaceable by means of a piston for the purpose of delivering the depositing tube with the stockings to a depositing frame and for receiving a new depositing tube from a magazine.

The depositing device may also be so designed that the depositing tube is arranged on a lever or lever system oscillating in a perpendicular plane. The lever with the depositing tube mounted transversely at its end carries out in one operation the movement necessary for gripping and lowering the stockings. Moreover, this provides the advantage that the depositing tube arrives parallel to the suspended stockings.

Several embodiments of the invention will now be described by way of example and with reference to the accompanying drawings, in which:

FIG. 2 is a front view of the pulling-off device of FIG. 1 in the position which it assumes when the pulling-off operation begins;

FIG. 2a is a front view of the pulling-off device of FIG. 1 after the stockings have been pulled off and pushed together;

FIG. 11 is an elevational view of another embodiment of depositing device;

FIG. 12 is a top plan view of a detail of FIG. 11, showing one of a plurality of depositing plates on an enlarged scale;

FIG. 12a is a sectional view of the depositing plate of FIG. 12;

FIG. 18 is a top plan view of the device of FIG. 17;

FIG. 19 is a view similar to FIG. 18 but showing the stocking forms pushed together;

FIG. 20 is a sectional view of grippers suitable for the invention;

FIG. 21 is a side elevation of a modification of the pulling-off device shown in FIG. 1;

FIG. 22 is a schematic sketch of the movements of the pulling-off device of FIG. 21;

FIG. 23 is a side elevation showing the principle of another pulling-off device;

FIG. 25 is an elevation of an embodiment of the orienting device of FIG. 2 which is likewise subject matter of the present invention;

FIG. 26 is a top plan view of FIG. 25;

FIG. 27 is an elevation showing how the orienting device according to FIGS. 25 and 26 is introduced between the stocking forms;

FIG. 28 is a view similar to FIG. 27 but showing the orienting device after having been supplied with compressed air;

Figure 1:
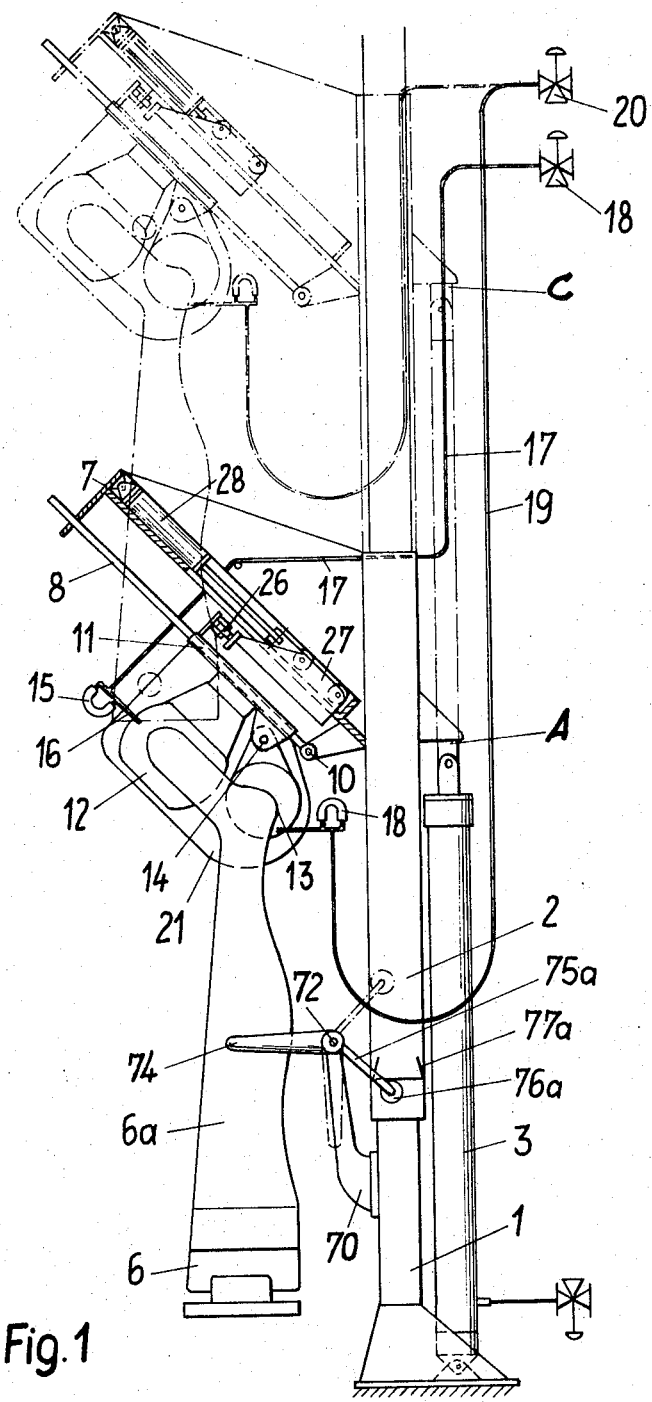
FIG. 1 is an elevational view of a pulling-off device according to the invention as seen in the direction of the packets of forms.

FIG. 1 shows a pulling-off device which consists of a column 1 mounted on the floor or on a finishing machine and having a carriage 2 sliding thereon. The carriage 2 is moved by means of a cylinder 3 between a lower end position A and an upper end position C. A frame 7 is secured to the carriage at an angle which substantially corresponds to the inclination of the foot portions of forms 6 for stockings 6a. Round bars 8 corresponding in number to the number of forms in the packet of forms 6 are provided in this frame 7. In the illustrated embodiment the packet of forms consists of 16 forms. One of the ends of the round bars 8 engages in a slot 9 (FIG. 2) of the frame 7, whereas the other ends rest on a carrier bar 10 of the frame 7. The central bar 8 is fixed in its position. All other bars 8 can be shifted transversely in the slot 9 and on the carrier bar 10.

Tubes 11 are slidably arranged on the bars 8. The tubes carry detachable foot tip grippers 12 and detachable heel grippers 13. The foot tip grippers 12 are firmly connected with the tubes 11, whereas each of the heel grippers 13 is mounted on the tubes by means of a bolt 14 in such a manner that it can perform an oscillating motion in the direction of the forms 6. By this arrangement the heel grippers 13 are intended to be adjusted during the pulling-off operation to the actually most advantageous direction of pulling.

The grippers 12, 13 are inflatable hollow bodies 12a (FIG. 20) which may consist, for example, of rubber and each body 12, 13 also includes a relatively rigid web 13a. They can be inflated until they contact the stockings 6a and exert a pressure necessary for the pulling-off operation. The foot tip grippers 12 are connected with one another by means of flexible hoses 15. The inflating air is admitted through conduits 16 and 17 from a three-way valve 18 and supplied by a source of compressed air not shown. Analogously also the heel grippers 13 are supplied with compressed air through the flexible conduits, a common admission conduit 19 and a three-way valve 20.

As shown in FIG. 2, each of the outermost grippers is supported on a plate 21 or 21a, respectively. The plates 21 and 21a on both sides are fixed to piston rods 22 and 22a of cylinders 23 and 23a. The cylinders 23 and 23a also serve to push the stockings 6a which have been pulled off the forms 6 together in the upper end position C as can be seen from FIG. 2a. The cylinders 23 and 23a which are operated by compressed air or by hydraulic means also cause the bars 8 to be pulled part. A hook-shaped reinforcing bracket 24 or 24a is secured to the plate 21 or 21a, respectively, and each bracket 24, 24a is slidably mounted on a rod 29 fixed between the cylinders 23, 23a for guiding the lower portions of the plates 21, 21a during the movement thereof between the positions illustrated in FIGS. 2, 2a. The plates 21 and 21a are also connected to the outermost tubes 11. The uniform distance between the bars 8 when being pulled apart is ensured by small chains 25 which connect each two adjacent bars. When they are pushed together as seen in FIG. 2a, the chains 25 depend loosely and thus permit the stockings which have been pulled off, to be pushed closely together. As shown in FIG. 1, the tubes 11 sliding on the bars 8 are supported by rollers 26 on a carriage 27. The carriage 27 can be actuated by means of a piston 28 so that at the beginning of the pulling-off operation a movement of the stockings parallel to the angular position of the bars is rendered possible.

Figure 3:
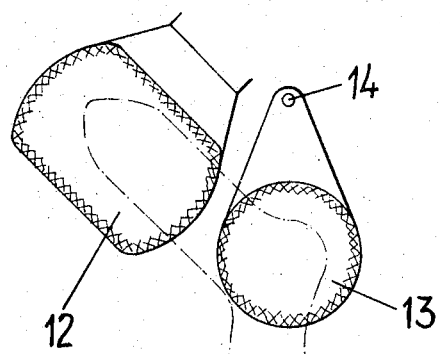
FIGS. 3 to 5 are detail views showing a gripping device of the pull-off device of FIG. 1 in successive working steps during its operation.
Figure 4:
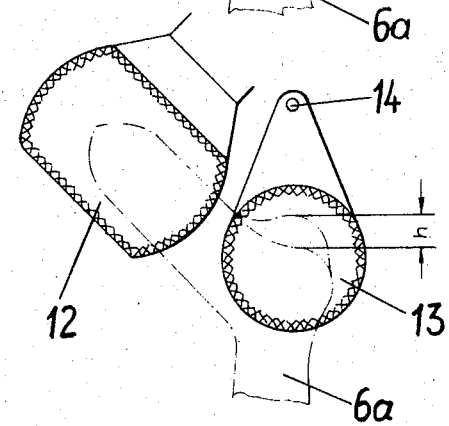
Figure 5:
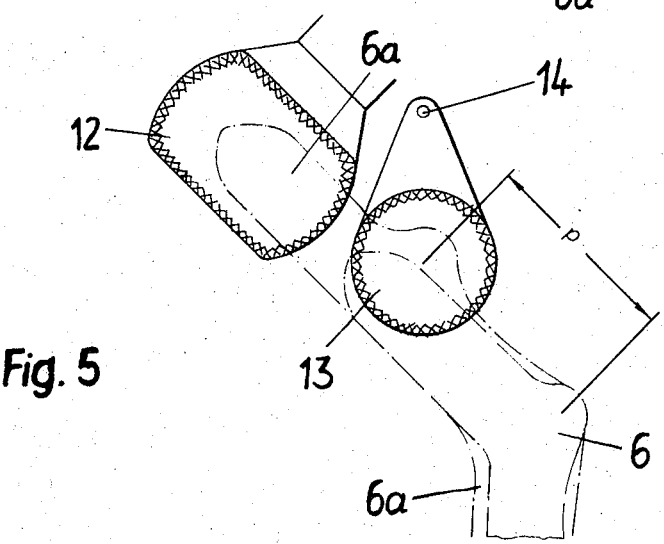

The pulling-off operation will be evident from the representations in FIGS. 3 to 5. FIG. 3 shows the moment where the heel gripper 13 is supplied with compressed air and pressed against the stocking 6a on the form 6. The foot tip gripper 12 does not yet receive compressed air. FIG. 4 shows how the entire frame is lifted up by the amount h for starting the pulling-off operation so that the heel on the stocking is lifted by the heel gripper 13. During this process the heel gripper 13 can adjust itself automatically into the most advantageous direction of pulling since it is mounted for oscillation. During movement through the path $h$ the foot tip gripper 12 has slid past the stocking because it had not yet been pressed against the stocking by compressed air. Only after having moved through the path $h$ the foot tip gripper 12 is supplied with compressed air and pressed against the foot portion of the stocking. After that all the grippers are moved in common by the amount $p$ in the direction of the foot by shifting the tubes 11, as shown in FIG. 5. In this manner the entire foot portion of the stocking is pulled off. The vertical motion of the entire frame starts from this position and continues up to the upper end position C which can be seen from FIG. 1.

Figure 6:
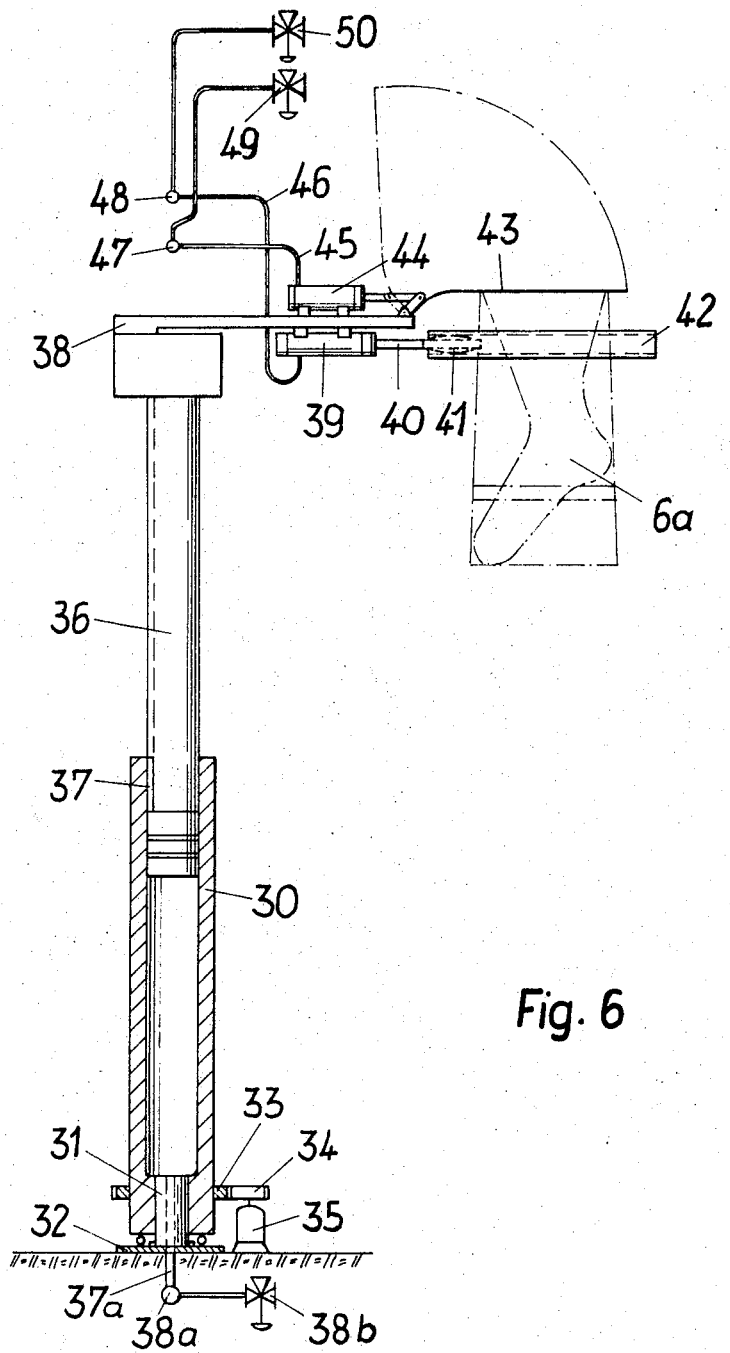
FIG. 6 is an elevational view of a depositing device associated with the pull-off device of FIG. 1.

A device for taking off and depositing according to FIG. 6 consists of a rotatably mounted hollow column 30 which is arranged for rotation about a pivot 31. The pivot 31 is anchored in the ground with a base plate 32. The hollow column 30 carries a toothed wheel rim 33 near its lower end which with a pinion 34 and a motor 35 provides for rotation of the column 30. A second column 36 in the form of a piston moves in the hollow column 30. This second column 36 can be lifted by compressed air admitted through a three-way valve 38$b$, a ball-and-socket joint 38$a$ and a conduit 37$a$ and can be lowered under gravity. With respect to rotary movement, the two columns 30 and 36 are interconnected by a feather key 37.

A cantilever arm 38 is mounted on the upper part of the column 36. Mounted on this cantiliver arm 38 is a cylinder 39 having a piston rod 40 which carries a spring sleeve 41. A depositing tube 42 is fitted on this spring sleeve 41. The stockings 6$a$ of the entire packet of pulled-off stocking are located on the depositing tube 42. To prevent the stockings from slipping off, at least as long as the cantilever arm 38 moves, they are held by a spring bow 43. This spring bow is mounted so as to be tiltable through 90° and may be actuated by a cylinder 44. Compressed air for actuating the cylinders 39 and 44 is supplied through three-way valves 49 and 50, ball-and-socket joints 47 and 48 and tube conduits 45 and 46.

Figure 7:
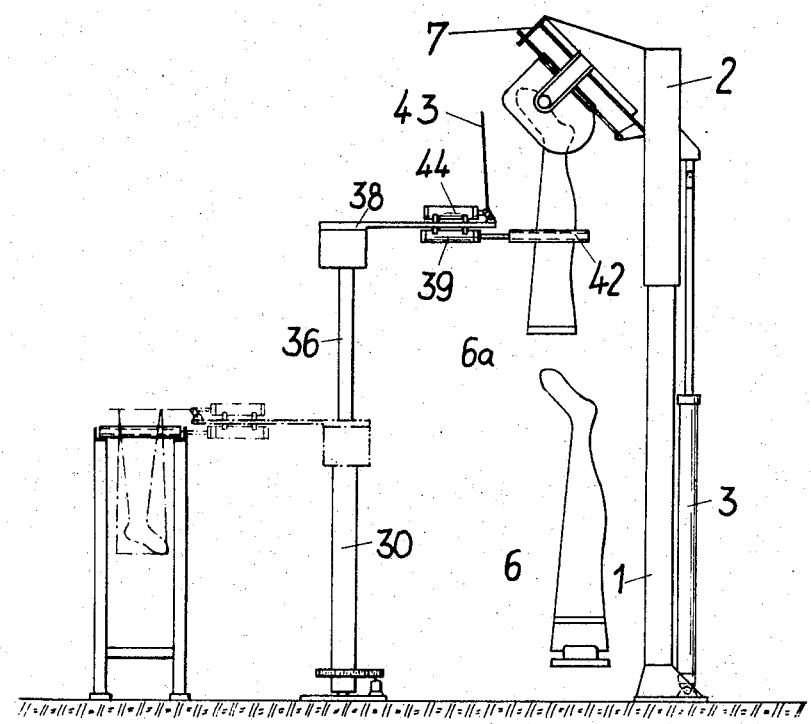
FIG. 7 is an elevational view of the depositing device of FIG. 6 showing its cooperation with the pulling-off device according to FIG. 1.
Figure 8:
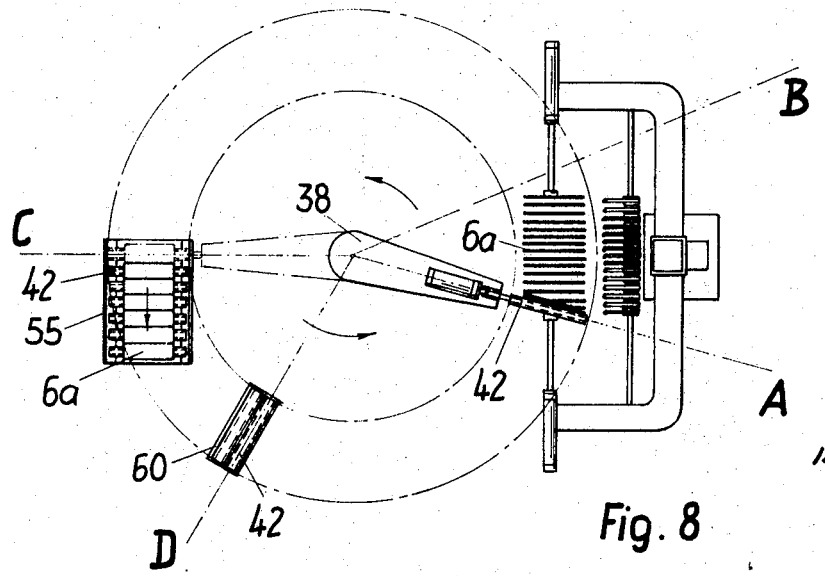
FIG. 8 is a top plan view of the depositing device of FIG. 7.

The cooperation of the inititally described pulling-off device with this device for taking off and depositing is shown in FIG. 7 in elevation and in FIG. 8 in top plan view. First a packet of forms with the stockings the treatment of which is finished is brounght before the pulling-off device as can be seen in FIG. 2. The frame 7 with the grippers is lowered until the grippers are located in the region of the foot portions between each two adjacent forms, the grippers being pulled apart to the spacing determined by the chains 25. Then compressed air is admitted to the heel grippers 13 which come into engagement. After that the frame 7 is lifted by the amount $h$ (FIG. 4) so that the heels of the stockings are lifted on all the forms of the packet. Then the foot tip grippers 12 are brought into engagement by compressed air, and by actuating the carriage 27 the foot portions are pulled off together by being moved by the amount $p$ according to FIG. 5. Thereafter, the frame 7 with all the stockings moves upwardly on the column 1 until the upper end position C is reached. Then the pistons 22 and 22$a$ are operated to force the gripping devices together as shown in FIG. 2$a$, the inflated grippers 12 and 13 letting off so much air as is necessary for pressing them together. In the meantime, however, the stockings are continued to be held in the suspended position, but as a packet ready for depositing.

Now the cantilever arm 38 with the depositing tube 42 moves from the position A into the position B, as shown in FIG. 8. It will be seen from FIG. 7 that the depositing tube 42 grips the stockings at about half of their length, the stockings hanging in a poacket, i.e. at minimum intervals. In the position B the packet of stockings is located completely on the depositing tube 42. In this position the spring bow 43 is turned down and the packet of stockings is clamped. Then the compressed air in the gripping members is let off until the stockings are released and the foot portions of the packet will drop down laterally on the depositing tube.

The cantilever arm 38 now moves into the position C and is lowered to the height of a depositing frame 55 arranged there. In the position C the depositing tube 42 and the packet of stockings 6$a$ have reached the depositing frame 55. Here the depositing tube 42 with the packet of stockings 6$a$ thereon is deposited. The depositing tubes 42 with the packets of stockings thereon are introduced into the frame 55 in the direction of the arrow. The further transportation of the depositing tubes 42 with the packets of stockings is effected by the pressure of each newly arriving depositing tube in the position C. The depositing frame 55 may be made as large as desired. For example, the amount of stockings treated in one hour or in two hours may be deposited. When the depositing frame 55 is filled it is manually exchanged for an empty one.

Figure 10:
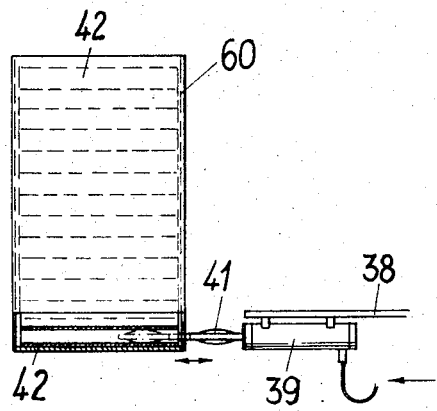
FIG. 10 is an elevation of a magazine containing depositing tubes.
Figure 10A:
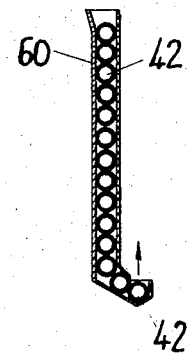
FIG. 10a is a side view of the magazine shown in FIG. 10.
Figure 9:
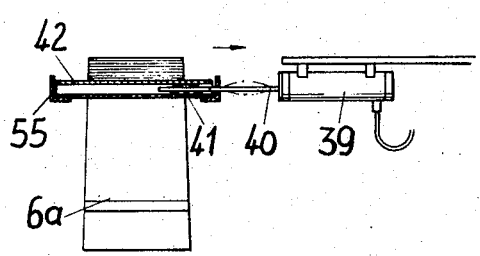
FIG. 9 is an elevational view of a detail of the depositing device showing a depositing tube thereof on an enlarged scale.
Figure 9A:
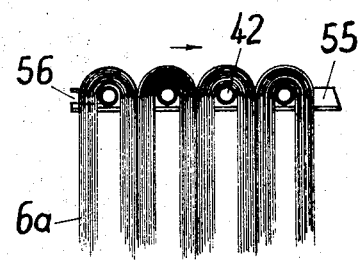
FIG. 9a is a side elevation of a depositing frame with depositing tubes having stockings suspended therefrom.

After the depositing tube has been introduced into the depositing frame 55 the depositing device is separated by pulling the spring sleeve 41 out of the depositing tube 42. The one beam of the depositing frame 55 is provided with a slot 56 which is of such size that the spring sleeve 41 can be pulled out while the depositing tube 42 remains in the frame. After depositing, the cantilever arm 38 travels into the position D (FIG. 8). In this position there is a magazine 60 filled with depositing tubes 42 as can be seen from FIGS. 10 and 10$a$. For taking out a new depositing tube 42 the spring sleeve 41 moves into the magazine by actuating the piston rod 40 and takes out a new depositing tube 42 by moving it upwardly. With the new depositing tube the entire column 36 again moves vertically upwardly into the position A according to FIG. 8 where in the meantime a new packet of stockings hangs ready for depositing.

Within the scope of the invention it is possible to effect the deposition of the packets of stockings also in another manner. For example, instead of the depositing tubes a depositing plate may be used on which the packet of stockings is deposited lengthwise, i.e. without folding it. The filled depositing plates may be stacked.

As a further modification also an endless belt may be used for depositing. Thereby transportation into the weaving mill may be effected.

According to the embodiment shown in FIGS. 1 to 2 the stocking forms arrive on a straight path. In some machines, however, the packets of stockings are moved in a curved path. In such machines the frame 7 with the grippers 12 and 13 must be formed according to the curved course of the path. With the arrangement of a circular path the entire pulling-off device may be suspended over the center.

The stocking forms do not always extend exactly parallel and at the same spacings because of the peculiarity in which they are stressed when pulling on the stockings and because they are secured at the lowermost end within the packet. The upper foot portions sometimes extend at different larger or smaller spacings side by side. For this reason introduction of the pulling-off members, e.g. the grippers 12 and 13, between the individual forms of the packet of forms is difficult. To ensure correct introduction, a comb-like orienting apparatus is used. By its use shortly before introducing the grippers the stocking forms are adjusted to the same spacings and in parallel.

The orienting apparatus which is shown in FIGS. 1 and 2 consists of a carrier frame 70 screwed to the column 1 and having eyes 71$a$ and 71$b$ in which a round bar 72 is mounted. A comb-shaped orienting lever 73 is rotatably mounted on the bar 72 and has prongs 74 forwardly tapering in the manner of tines and preferably made of yieldable material. On the side remote from the prongs 74 the comb-like orienting lever 73 has two control levers 75$a$ and 75$b$ provided with rollers 76$a$ and 76$b$. The carriage 2 on the column 1 carries two control abutments 77a and 77b. By moving the carriage 2 downwardly, on introducing the grippers 1 2and 13 between the forms 6, the prongs 74 are passed between the forms 6 by being turned through about 90°. Hereby the forms are aligned. The comb-like orienting lever 73 must be turned and the prongs 74 must be introduced before the grippers 12 and 13 move in between the forms. As soon as the abutments 77a and 77b release the control levers 75a and 75b the prongs 74 drop back into the vertical position under gravity as indicated in dash-and-dot lines.

The construction of the grippers and their introduction into the intervals between the forms is an essential part of the present invention. It has been found that the inflatable rubber bodies which are known per se for the individual pulling-off operations cannot be easily simultaneously introduced in rows between the forms since they assume an irregular shape in the deflated condition and thus are not aligned. This problem is solved by the special shape of the grippers as shown in FIG. 20 and the shiftable handling described hereinafter.

As shown in FIG. 20, a web 13a is provided centrally in each gripper 12, 13 for stiffening, the elastic skin being stretched over the web on both sides. Before introduction the grippers are filled with air until they contact each other laterally. By this measure the tapered ends of the grippers are adjusted to the center of the interval between two forms. In the air-filled condition the tapered ends of the grippers are then introduced into the intervals. The introducing operation is facilitated by the pointed form of the grippers. Also for facilitating introduction of the grippers the forms have already previously been aligned. After the ends of the grippers have been correctly introduced they can be completely moved in after the air has been let off.

As a further embodiment of the invention a depositing device with stackable depositing plates or boxes will now be described with reference to FIGS. 11-15.

On the whole, the principle of the depositing device shown in FIG. 6 has been maintained. In FIG. 11 a column 80 is shown which is rotatably mounted on a carriage 81. An electric motor 84 is provided for rotation of the column 80 by means of a toothed wheel rim 82 and a pinion 83. A cantilever arm 85 is mounted on the column 80 and carries a pneumatically operated cylinder 86 having a piston rod 87 provided at its free end with a flattened receiving member 88. A depositing plate 89 is detachably fitted on this receiving member 88 by means of a receiving lug 90 secured to the depositing plate. The depositing plates 89 can be stacked upon one another by means of feet 91 mounted at all four corners of the depositing plate and fitting in corresponding recesses of the lower plates.

Figure 13:
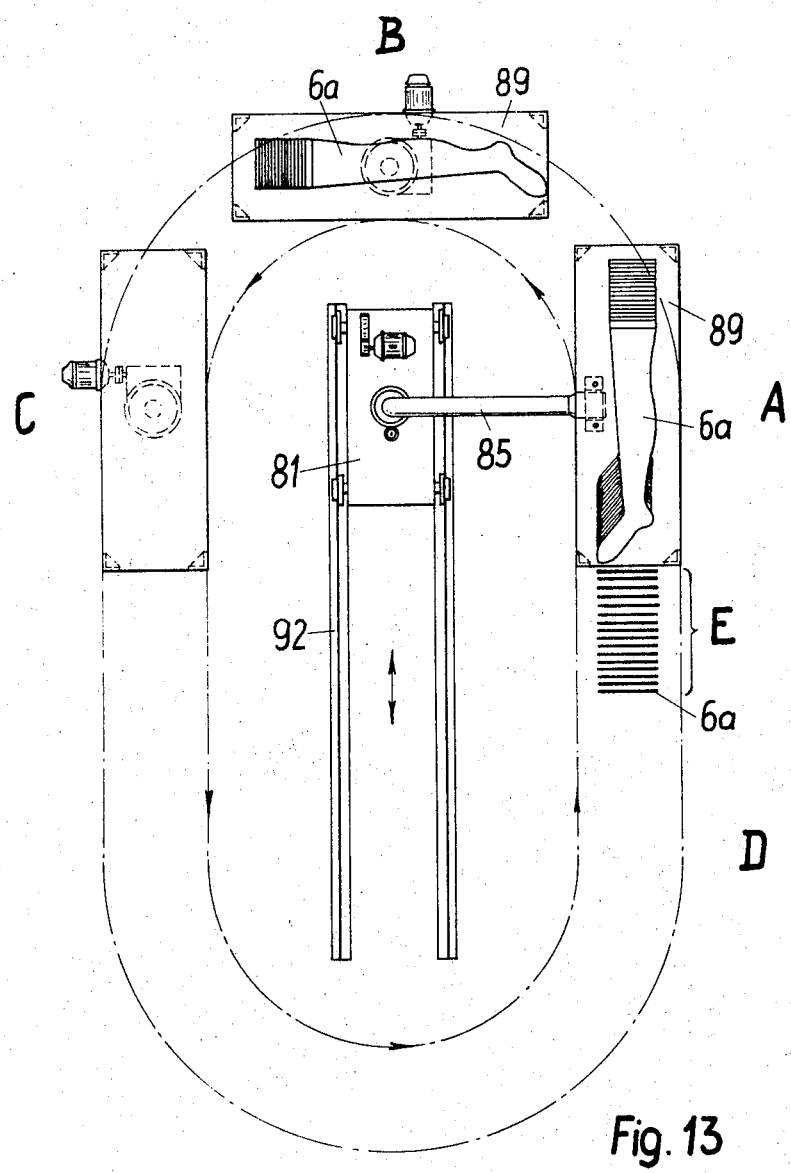
FIG. 13 is a top plan view of the depositing device of FIG. 11.
Figure 14:
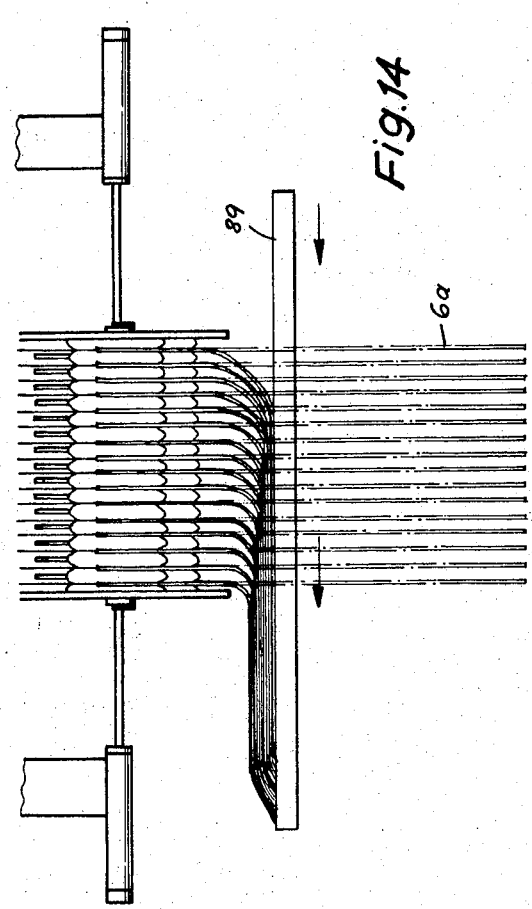
FIG. 14 is an elevation showing one of the plurality of depositing plates during the operation of taking off a packet of stockings.

FIG. 13 shows the carriage 81 which is movable on rails 92 in the end position A, that is the position in which the stockings 6a lie already lengthwise on the depositing plates 89. Taking over of the stockings 6a from the vertically suspended position in the not shown pulling-off device into the horizontal position on the depositing plate 89 is effected when the carriage 81 moves from the position D to the position A. In this operation the depositing plate 89 is moved at the required height laterally into the vertically suspended packet of stockings 6a in the position E. With further movement, the stockings, which are still held in the not shown grippers of the pulling-off device, are deposited on the depositing plate 89. Not until the entire stocking with the exception of the retained foot portion is located on the depositing plate, the grippers of the pulling-off device are opened. When the carriage 81 simultaneously moves into the position A the entire packet of stockings is deposited lengthwise on the depositing plate. This process is illustrated in FIG. 14. After the stockings are located one upon another on the depositing plate, the cantilever arm 85 swings through 90° in the direction of the arrow into the position B which is the depositing position for the depositing plate 89 loaded with the stockings 6. Now the receiving member 88 is pulled out of the lug 90 by retracting the piston rod 87 into the cylinder 86 and the depositing plate is released and put down upon a receiving table or upon already stacked plates. After that the cantilever arm 85 turns through 90° and moves into position C where it receives a new empty depositing plate 89 due to the reverse actuation of the cylinder 86. The cantilever arm 85 provided with an empty receiving plate then moves in the direction of the arrow into position D, the carriage 81 moving on the rails 92 into the end position corresponding to position D.

Figure 15:
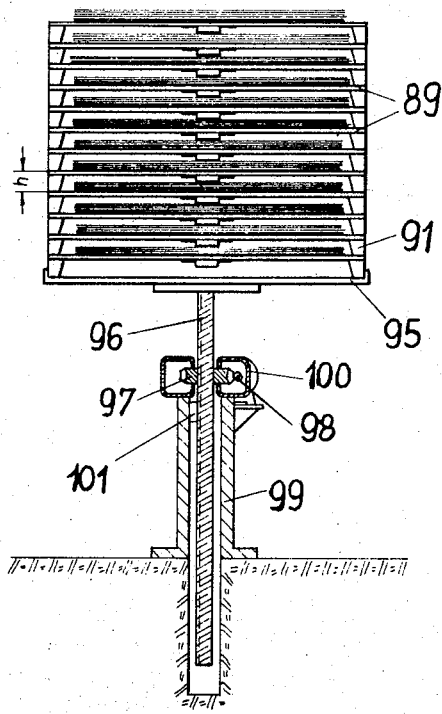
FIG. 15 is an elevation, partly in section, of a receiving station for the depositing plates of the depositing device of FIG. 11.

The receiving station in B for depositing plates loaded with stockings and the receiving station in C for empty depositing plates are practically of the same construction which is shown in FIG. 15. The receiving stations comprise a base plate 95 on which the depositing plates 89 may be stacked and which is rigidly secured to a spindle 96 held in a nut 97 which constitutes the worm wheel of a worm gear 98. The worm gear is seated on a hollow column 99 which is secured to the ground. The worm gear is driven by an electric motor 100. The spindle 96 is secured against rotation by a feather key 101 which engages in a continuous groove of the spindle. The pitch of thread of the spindle 96 is so dimensioned that with one rotation of the nut 97 the spindle with the base plate 95 is lowered by the height $h$ of the depositing plates. Thus, when after each cycle or pulling-off operation the nut makes one rotation the depositing plate will always remain at the same height from the ground. Hereby the new depositing plate with its stockings may be deposited at the same height and stacked upon the lower ones. When so many depositing plates with stockings have been stacked that the base plate has reached its lowermost position the entire stack must be manually removed and transported to the folding department. After that the base plate must be brought back into the uppermost position and the depositing position is ready for depositing new receiving plates. The receiving station where the arm receives empty depositing plates works analogously in the same manner only that after each cycle the spindle must be lifted by the height $h$ of a receiving plate to permit an empty depositing plate to be received at the same height from the ground.

Figure 16:
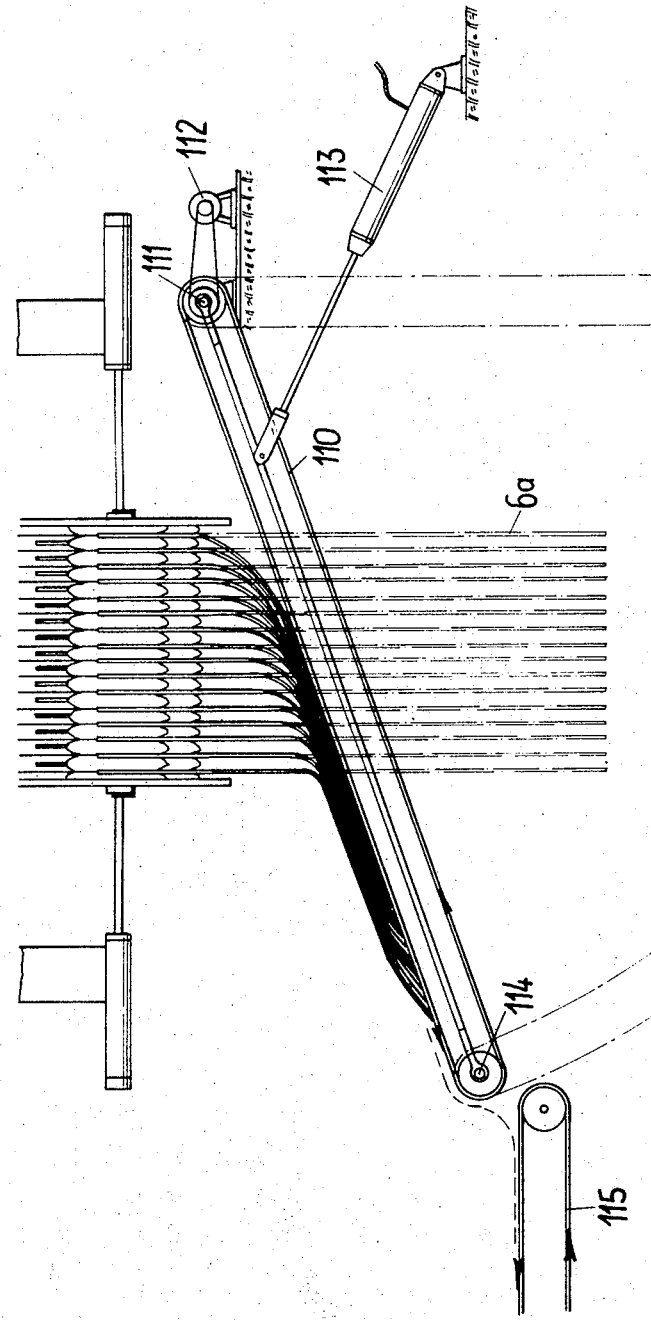
FIG. 16 is a schematic elevational view of a third depositing device of this invention.

FIG. 16 shows a further example of depositing and transporting the stockings pulled off by the pulling-off device and pushed together like packets. An endless belt 110 is swingably mounted for circulation in the direction of the arrow adjacent the stockings 6a hanging in packets and can be swung about a stationarily mounted bearing 111. A motor 112 is provided for driving the endless belt 110. The swinging from the vertical position indicated in dash-and-dot lines into the working position is effected by a cylinder 113. The endless belt 110 has a reversing roller 114 located in working position of the belt 110 above a second endless belt 115 arranged for circulation in the direction of the arrow. This belt serves for further transportation of the pulled-off stockings which are expediently conveyed directly up to the folding department where they can be assorted directly on the belt.

Figure 17:
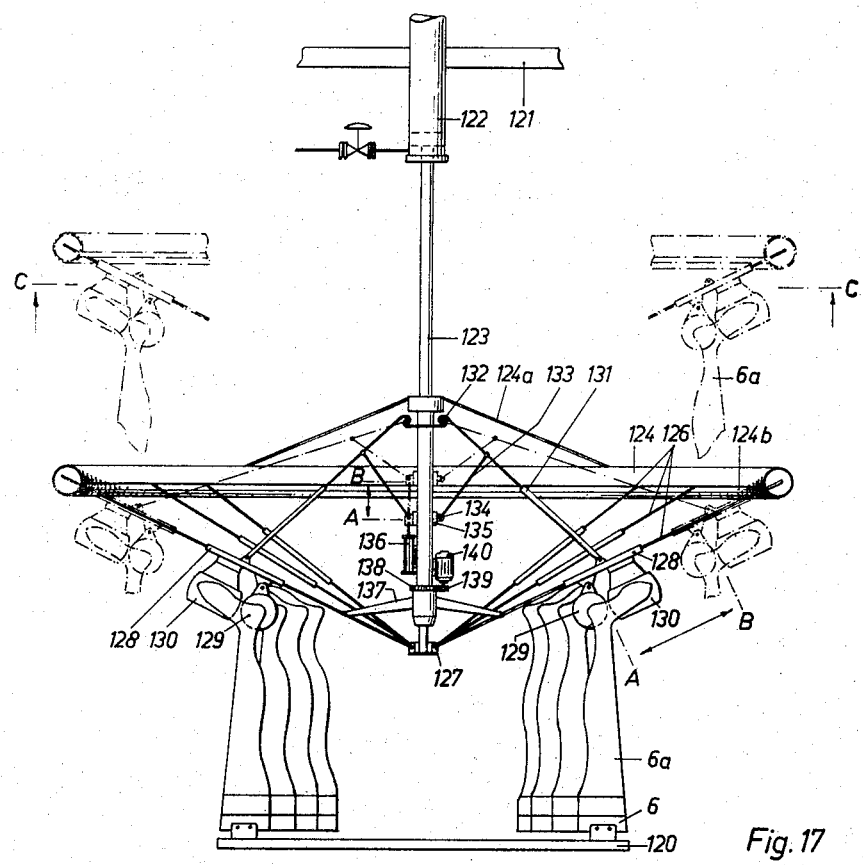
FIG. 17 is a sectional view of a pulling-off device for packets of forms arranged in a circle.

A further embodiment of a pulling-off device is shown, partly schematically, in FIGS. 17, 18 and 19 and is intended for a packet of forms arranged in a circle. FIG. 17 represents a section through the device. The stocking forms 6 with the stockings 6a are arranged in a circle on a table 120. Therefore, the pulling-off device must be suspended above the forms. The suspension is effected on a steel structure 121 on which a cylinder 122 operated by compressed air is mounted. The entire pulling-off device is suspended from a piston rod 123 and consists of a closed guide ring 124 suspended from the piston rod by struts 124a and having a slot 124b in which rods 126 are shiftably mounted. The other ends of the rods 126 are mounted in a pan-like bearing 127 at the end of the piston rod 123 so as to be shiftable around the center. Tubular carriages 128 are slidably mounted on these rods 126 and carry inflatable gripper members 129 and 130. Lever rods 131 are swingably secured to these tubular carriages 128 and are centrally suspended from a bearing ring 132. Further levers 133 are swingably secured to these lever rods 131. The ends of the levers 133 are centrally received in a bearing ring 134 mounted on a ring 135 which is axially shiftably mounted on the piston rod 123. By means of a cylinder 136 to the piston rod of which the ring 135 is secured, the latter can be shifted from the position A to the position B.

It will be apparent that during this movement the tubular carriage 128 will likewise be shifted on the rods 126 from the position A to the position B. This movement corresponds to the second cycle of the pulling-off operation as previously described. When now compressed air is admitted below the piston of the cylinder 122 the entire pulling-off device will move upwardly into the position indicated in dash-and-dot lines and all the stockings are pulled off.

For this purpose evidently compressed air must be fed into the inflatable gripper members 129 and 130 in accordance with the individual pulling-off operations. This operation has been described in detail with reference to the first embodiment. To permit the pulled-off stockings 6a to be pushed together to a packet which can be deposited, the rods 126 must be laid together in the form of a fan around the center. For this purpose a rocking lever 137 is secured to two of the rods 126 which are displaced relative to each other through 180°. This rocking lever 137 is mounted centrally on the piston rod 123 and carries a toothed wheel rim 138 which can be rotated by a pinion 139 and a motor 140.

In this example of two depositable packets of stockings the operation of pushing the stockings 6a together in fan fashion is illustrated in FIGS. 18 and 19. FIG. 18 shows a condition in which the stockings 6a are still seated on the forms 6. According to FIG. 19 they have been pulled off and pushed together to form a packet. The lever 137 is secured to one of the rods 126 designated by reference numeral 126a, on the one hand, and, displaced through 180°, to a rod 126b. Rods 126c and 126d are rigidly secured in their positions. When the lever 137 turns in the direction of the arrow as shown in FIG. 18 the individual rods 126 are pushed together in the form of a fan until they contact and the stockings are located together in the form of a depositable packet as shown in FIG. 19. In the described example two packets of stockings are obtained which, of course, must also be deposited each by itself as previously described. When turning the lever 137 in the reverse direction the rods 126 are spread in the form of a fan and to ensure that the rods 126 are at the right spacings when spread, small link chains 141 are arranged between the same.

The pulling-off device shown in FIG. 21 corresponds to the one shown in FIGS. 1 and 2 as to the elements designated by the same reference numerals. Therefore, only the elements which are different will be described hereinafter.

Contrary to the pulling-off device shown in FIGS. 1 and 2, in the embodiment shown in FIG. 21 the bars 8 are not mounted obliquely in the direction of the feet but horizontally.

The tubes 11 slidable on the bars 8 are supported by the rollers 26 on the carriage 27 in the same manner as in the device according to FIG. 1. The carriage 27 can be actuated hydraulically by means of the piston 28.

The pulling-off operation is shown schematically in FIG. 22. In the position indicated by x first the heel grippers operate. Then the movement in the vertical direction, which is indicated by I, takes place, whereby the heels are released. The next movement takes place in the direction of the arrow II, i.e. in the direction of the feet. This movement is composed of the components IIa, i.e. the components of the movement of the tubes 11 on the bars 8, and of the movement IIb, i.e. the movement of the entire frame in the direction of lifting. After this movement only the lifting movement III takes place until the stockings are completely pulled off.

The component of the movement indicated by II results from a simultaneous lifting movement of the entire frame with the aid of the cylinder 3 and a simultaneous pushing movement of the tubes 11 on the bars 8 in horizontal direction. In a device as shown in FIG. 21 both movements are expediently performed hydraulically by cylinder pistons from a common hydraulic plant. Hydraulic admission conduits 140a and 141A lead to the piston 28 of the cylinder for the pushing movement, the conduits being provided with throttle valves 142 and 143, respectively. A hydraulic conduit 145 leads to the cylinder 3 and is provided with a valve 146. Hydraulic conduits H lead into a control valve 144 just as a compressed-air conduit P which can likewise be opened by control. The compressed-air conduits 17 and 19 lead from the control valve 144 to the gripping device. The control valve 144 serves to control the hydraulics and pneumatics in the manner shown in FIG. 22.

Figure 24:
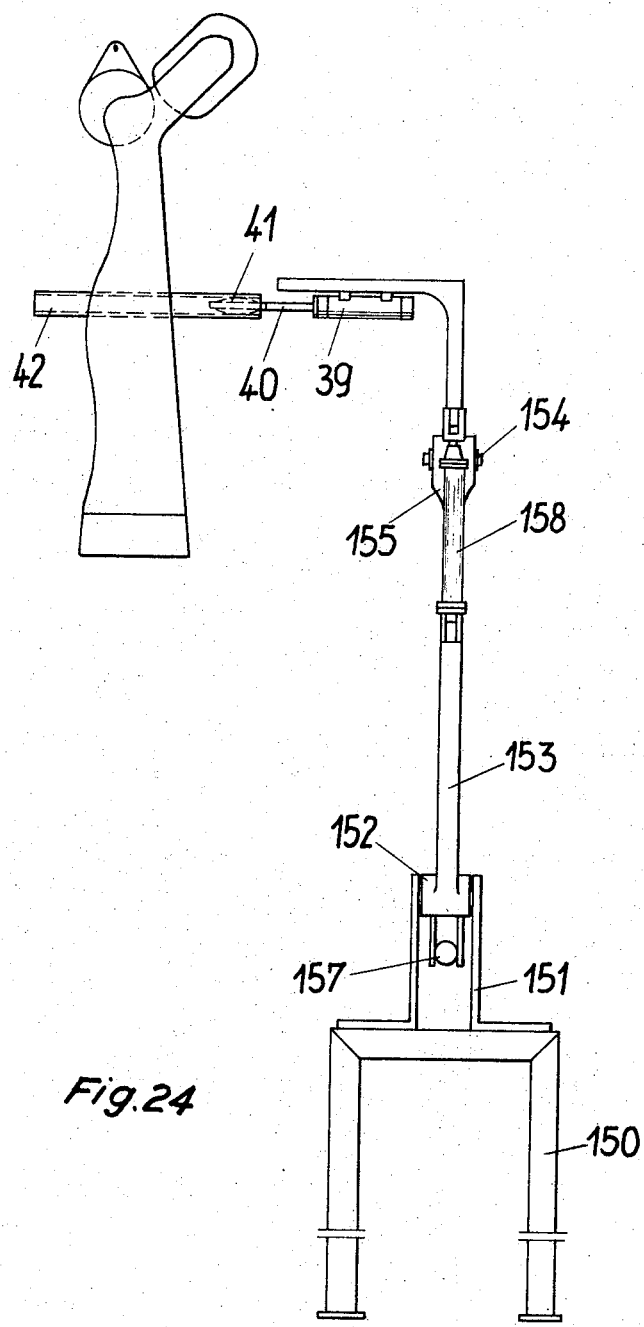
FIG. 24 is an elevation of the pulling-off device of FIG. 23 as seen in the direction of oscillation.

The depositing device according to FIGS. 23 and 24 consists of a frame 150 and a bearing 151 provided with a hinge 152. A rocking lever 153 is swingably mounted on the hinge 152. A stretching lever 155 is pivotally mounted by means of a hinge 154 at the end of the rocking lever 153. As can be seen from FIG. 24, the cylinder 39, the piston rod 40, the spring sleeve 41 and the detachably fitted depositing tube 42 are transversely mounted at the end of the stretching lever 155.

When the depositing device operates, first the position designated by a in FIG. 23 is occupied, the rocking lever 153 being actuated by a hydraulic cylinder 157 and the stretching lever 155 by a cylinder 158. In the position a the lever 155 is in stretched position, an empty depositing tube 42 being taken from a magazine 159 by moving the spring sleeve 41 transversely of the plane of swinging.

Before the stockings hang in the position indicated in FIG. 23 the rocking lever moves into the position B. Then the rocking lever moves back, the stockings being gripped by the depositing tube 42 and being placed over the latter. The levers then move into position c where the lever 155 is stretched to assume the position d. During the stretching operation the depositing tube 42 with the stockings hanging thereon is passed on to the depositing frame. Through the stretching movement produced by actuating the cylinder 158 the respective newly delivered depositing tube can be pushed on in the frame.

FIGS. 25 to 28 show the construction and use of a specially designed orienting apparatus for aligning the forms before introducing the gripping members. This orienting apparatus is mounted as in the embodiment shown in FIG. 1 and constructed like a comb with prongs which are moved in between the forms in common through the intermediary of control levers 75a and rollers 76a. According to FIGS. 25 to 28 the prongs 74 are surrounded by inflatable jackets 74a. During actuation of the orienting apparatus the prongs 74 are moved in between the forms in deflated condition as shown in FIG. 27. Then compressed air is admitted through a conduit 74b (FIG. 25), whereby the jackets 74a are inflated and align the forms 6 as shown in FIG. 28.

Figure 30:
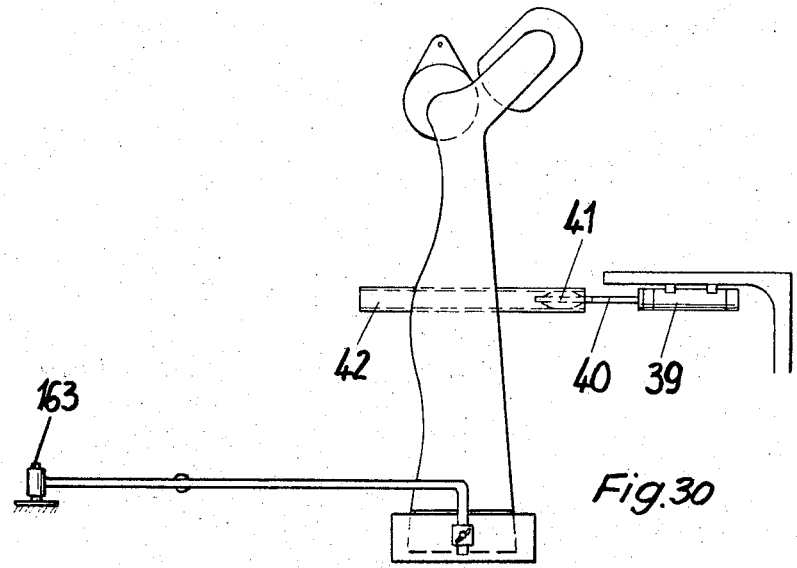
FIG. 30 is a side elevation to FIG. 29.
Figure 29:
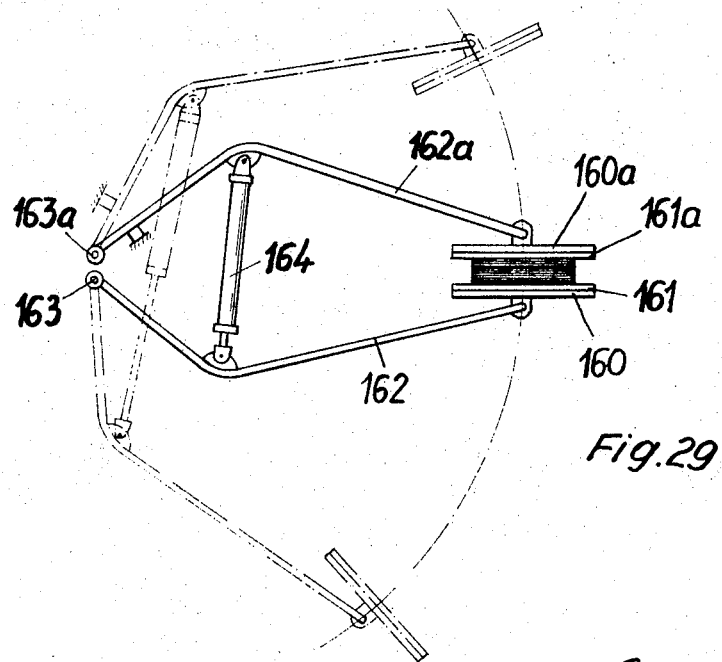
FIG. 29 is a top plan view of an additional device to be used with the depositing device of FIG. 23 and intended to ensure smooth depositing in the case of particularly light stockings.
Figure 31:
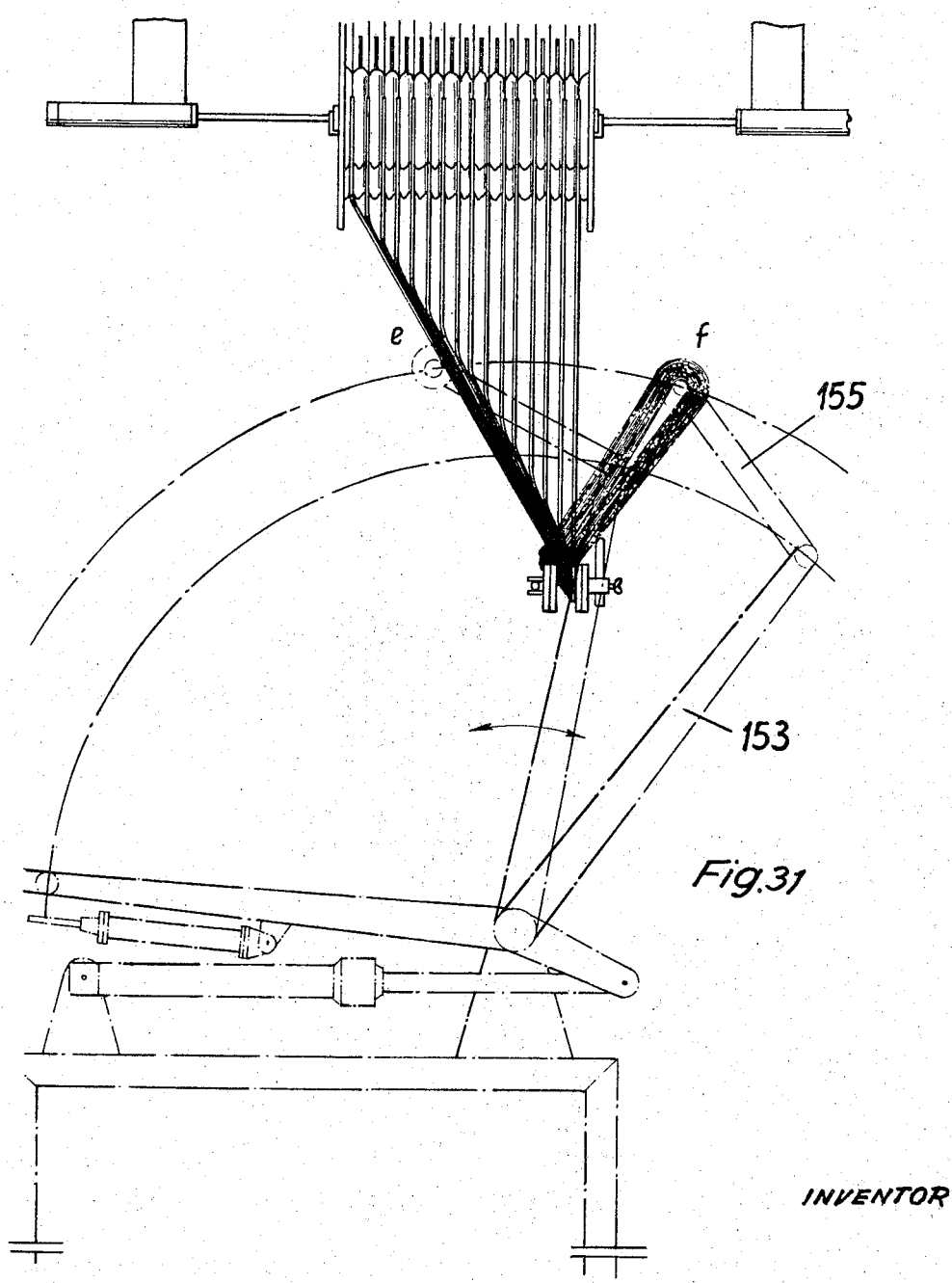
FIG. 31 is a side elevation showing the cooperation of the device of FIG. 29 with the device shown in FIG. 23.

A depositing device as shown in FIG. 23 may be further developed as shown in FIGS. 29, 30 and 31.

With certain types of light stockings difficulties are encountered in taking over the packet of stockings from the depositing tube 42. The stockings are not placed smoothly around the depositing tube. It is therefore proposed to additionally provide two gripper plates 160 and 160a at the level of the lower end of the double top of the stockings for pressing the packet of stockings together at this level after the stockings have been pulled off the forms and pushed together, the gripper plates 160 and 160a being provided with grippy linings 161 and 161a which may consist of rubber, plastic or another suitable material as shown in FIG. 29. The gripper plates 160 and 160a are adjustably secured to rods 162 and 162a mounted on stationary pivots 163 and 163a. A piston drive 164 is fixed between the rods 162 and 162a for opening and closing the gripper plates 160 and 160a.

FIG. 31 shows how the pulling-off operation is performed by means of the device described above. At the beginning of the operation the rocking lever 153 with the stretching lever 155 and the depositing tube 42 secured thereto is in the position e. The gripper plates 160 and 160a have already been pushed together by actuation of the piston drive 164 and have reduced the dimension of the packet of stockings in its lower part. During movement of the depositing tube from the position e to the position f the air is let off from the inflatable grippers and the tips of the stockings are placed over the depositing tube 42 while the gripper plates 160 and 160a still retain the packet of stockings. Not until the depositing tube returns from the position f to the position e and is approximately in the center are the gripper plates opened to release the stockings. After that the rocking lever 153 moves back into the depositing position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A device for pulling off stockings comprising a plurality of elongated forms disposed in generally side-by-side spaced relationship adapted to each externally telescopically support a stocking, a carriage means for moving said carriage in generally parallel relationship to the forms, a plurality of grippers, each form being provided with its own gripper, a frame carried by said carriage, means for moving said grippers generally transversely to the movement of said carriage and mean for actuating said grippers to grip portions of each of the stockings on each of the forms incident to simultaneous removal of each of the stockings from the forms upon the movement of said grippers and carriage.

2. The device as defined in claim 1 including means for moving said grippers relative to each other between a first position at which said grippers are in appreciable spaced relationship to each other and a second position at which said grippers are more closely adjacent each other than in said first position.

3. The device as defined in claim 1 wherein said grippers include expandable bodies, and means for selectively expanding said bodies.

4. The device as defined in claim 1 wherein said actuating means is also releasable to deactivate said grippers, and depositing means for receiving the stockings as a group upon the deactivation of said grippers.

5. The device as defined in claim 1 including means for orienting said forms in parallel equally spaced relationship.

6. The device as defined in claim 1 wherein said grippers include foot and heel grippers, and means mounting each of said heel grippers for swinging movement relative to said carriage.

7. The device as defined in claim 1 wherein said grippers include foot and heel grippers, means on said frame for slidably carrying said foot and heel grippers, and means mounting each of said grippers for swinging movement relative to said carriage.

8. The device as defined in claim 1 wherein means is provided for slidably mounting said grippers relative to said carriage, said grippers include foot and heel grippers, at least one of said foot and heel grippers having an expandable body, and means for selectively expanding said expandable body.

9. The device as defined in claim 1 wherein said grippers include means to move said grippers in a direction normal to the direction of movement of said carriage.

10. The device as defined in claim 1 including a generally vertically disposed column, said column including a reciprocal portion, said carriage being carried by said reciprocal portion, and said carriage moving means being coupled to said reciprocal portion for moving the latter and the carriage carried thereby.

11. The device as defined in claim 1 wherein each of said grippers includes a sleeve and a rod, each sleeve is telescopically carried by a rod which is in turn carried by said frame, and means mounting said rods for reciprocal movement in a direction generally normal to the direction of movement of said carriage.

12. The device as defined in claim 2 including a plurality of rods carried by said frame, means mounting said rods for reciprocal movement in a direction generally normal to the direction of movement of said carriage, a sleeve slidably carried by each rod, and said grippers being carried by said sleeves.

13. The device as defined in claim 3 including a generally flat web housed internally of each expandable body, and said expanding means are pneumatic means.

14. The device as defined in claim 4 wherein said depositing means includes an arm mounted for movement generally normal to the direction of movement of said carriage, said arm including a terminal end portion upon which the stockings are supported, and means for moving said arm generally normal to the direction of movement of said carriage.

15. The device as defined in claim 4 wherein said depositing means includes an arm mounted for movement generally normal to the direction of movement of said carriage, said arm including a terminal end portion, and a stocking support removably carried by said terminal end portion.

16. The device as defined in claim 4 wherein said depositing means includes an arm mounted for movement generally normal to the direction of movement of said carriage, said arm including a terminal end portion, and a tubular stocking support removably carried by said terminal end portion.

17. The device as defined in claim 4 wherein said depositing means includes mounting means for reciprocal movement thereof in a direction generally normal to the direction of movement of said carriage, said depositing means further including an arm mounted for swinging movement in a plane generally normal to the direction of movement of said carriage, and said arm including a terminal end portion upon which the stockings are supported.

18. The device as defined in claim 4 wherein said depositing means is a conveyor, and means are provided for moving said conveyor from a first position remote from said grippers to a second position underlying the grippers whereby stockings released by the latter are transported by the conveyor.

19. The device as defined in claim 4 wherein said depositing means is an arm mounted for swinging movement in a generally vertical plane, said arm having a terminal end portion, and means mounting said terminal end portion for swinging movement about a horizontal axis.

20. The device as defined in claim 5 wherein said orienting means is a comb-like member, and means for introducing fingers of the comb-like member between the forms prior to the actuation of said gripper.

21. The device as defined in claim 5 wherein said orienting means is a comb-like member having a plurality of fingers, each finger having an expandable body, means for selectively expanding each body, and means for introducing the fingers between the forms.

22. The device as defined in claim 5 wherein said orienting means is a comb-like member having a plurality of fingers, and means mounting said comb-like member for pivoting movement between first and second positions at which the fingers are between and removed from the forms respectively.

23. The device as defined in claim 7 wherein said forms and grippers are positioned in a generally circular pattern, and means are provided for collecting the grippers and stockings carried thereby into at least two groups.

24. The device as defined in claim 7 including means for gripping together all of the stockings remote from the heel and tip portions thereof and after all of the stockings have been removed from the forms.

25. The device as defined in claim 14 including means for holding the stocking securely in place upon said arm.

References Cited

UNITED STATES PATENTS

| 1,126,619 | 1/1915 | Coulston et al. | 223—112 |
| 1,711,334 | 4/1929 | Wanamaker | 223—112 |
| 3,054,542 | 9/1962 | Glaze et al. | 223—112 |
| 3,231,158 | 1/1966 | Rossak | 223—76 |

FOREIGN PATENTS

| 1,352,234 | 1/1964 | France. |

JORDAN FRANKLIN, *Primary Examiner.*

G. H. KRIZMANICH, *Assistant Examiner.*